United States Patent
Harder et al.

(10) Patent No.: US 9,429,817 B1
(45) Date of Patent: Aug. 30, 2016

(54) MODULAR IMAGE CAPTURE BOOTH

(71) Applicants: Brad Harder, Appleton, WI (US); Tiffaney VandenBush, Green Bay, WI (US); Dennis Burkhart, Green Bay, WI (US); Skyler Lauren, Green Bay, WI (US); Steve McLean, Green Bay, WI (US); William Van Epern, Kaukauna, WI (US)

(72) Inventors: Brad Harder, Appleton, WI (US); Tiffaney VandenBush, Green Bay, WI (US); Dennis Burkhart, Green Bay, WI (US); Skyler Lauren, Green Bay, WI (US); Steve McLean, Green Bay, WI (US); William Van Epern, Kaukauna, WI (US)

(73) Assignee: Wild Blue Technologies, Inc., De Pere, WI (US)

( * ) Notice: Subject to any disclaimer, the term of this patent is extended or adjusted under 35 U.S.C. 154(b) by 0 days.

(21) Appl. No.: 14/884,276

(22) Filed: Oct. 15, 2015

(51) Int. Cl.
*G03B 15/02* (2006.01)
*G03B 15/07* (2006.01)
*G03B 17/53* (2006.01)

(52) U.S. Cl.
CPC ............. *G03B 15/02* (2013.01); *G03B 15/07* (2013.01); *G03B 17/53* (2013.01)

(58) Field of Classification Search
CPC ....................................................... G03B 17/53
See application file for complete search history.

(56) References Cited

U.S. PATENT DOCUMENTS

| | | | | |
|---|---|---|---|---|
| 5,778,258 A | * | 7/1998 | Zamoyski | G03B 15/06 396/2 |
| 5,784,651 A | * | 7/1998 | Mauchan | G03B 17/53 396/2 |
| 6,099,129 A | * | 8/2000 | Hayashi | G03B 17/53 353/122 |
| 8,145,048 B2 | * | 3/2012 | Messier | G03B 15/06 396/2 |
| 9,046,740 B1 | * | 6/2015 | Smithweck | G03B 15/00 |
| 2011/0211819 A1 | * | 9/2011 | Reno | G03B 15/02 396/2 |

* cited by examiner

*Primary Examiner* — W B Perkey
(74) *Attorney, Agent, or Firm* — Reinhart Boerner Van Deuren P.C.

(57) ABSTRACT

A modular image capture booth with a plurality of frame members having horizontal and vertical members for assembly into a frame for the modular image capture booth. Each of a plurality of panels attaches to the frame. The plurality of panels forms walls and a ceiling for the modular image capture booth. Each panel has openings adapted to receive a digital camera. Each panel includes a router, and includes one or more lighting fixtures, and wiring from each opening in the panel to the router. The wiring is arranged to connect each digital camera to the router. An image processing computer is connected to of each router. The image processing computer processes the image recorded by each camera to construct a three-dimensional image of an object in the modular image capture booth. In a particular embodiment the modular image capture booth is made from a plurality of interlocking panels.

22 Claims, 9 Drawing Sheets

MODULAR IMAGE CAPTURE BOOTH

FIELD OF THE INVENTION

This invention generally relates to a modular image capture booth.

BACKGROUND OF THE INVENTION

There is a need for a device with the ability to capture an image and to create from the captured image a three-dimensional image and/or rendering. Embodiments of the invention provide such a device. These and other advantages of the invention, as well as additional inventive features, will be apparent from the description of the invention provided herein.

BRIEF SUMMARY OF THE INVENTION

In one aspect, embodiments of the invention provide a modular image capture booth that includes a plurality of frame members having horizontal and vertical members configured for assembly into plurality of panels that form a frame for the modular image capture booth. The modular image capture booth includes a plurality of panel sheets where each is configured for attachment to each of the plurality of panels. The plurality of panels forms walls and a ceiling for the modular image capture booth. Each panel includes a plurality of openings, with each opening adapted to receive a digital camera. Each panel includes a router configured to receive and transmit signals from each digital camera in the panel. Each panel includes further includes one or more lighting fixtures, and wiring from each opening in the panel to the router. The wiring is arranged to connect each digital camera to the router.

In a particular embodiment, an image processing computer is connected to of each router. The image processing computer is configured to process the image recorded by each camera to construct a three-dimensional image of an object in the modular image capture booth. Each of the plurality of panels includes one or more electrical plug connections. In certain embodiments of the invention, each of the plurality of panels has from 8 to 25 openings to receive the digital cameras, and wherein the modular image booth has from 68 to 160 openings to receive the digital cameras.

In certain embodiments, one of the plurality of panels includes a doorway. Further, in a particular embodiment, a single ceiling panel may form a ceiling of the modular image capture booth, and a plurality of wall panels extends from the ceiling to a floor under the modular image capture booth. In a particular embodiment, the frame and the single ceiling panel is octagonal and each of the wall panels is rectangular. In some embodiments, each panel includes one or more rows of LED lights that extend along an interior surface of its respective panel, and extends at least 75% of a length of the panel.

Each of the plurality of frame members can be made from extruded aluminum. In alternate embodiments, the frame members could be made from extruded plastic, or from a number of suitable metal or non-metal materials that are extruded, molded, formed, machined, etc. However, the plurality of frame members may be configured for assembly with the use of separate mechanical fasteners. In a particular embodiment, the mechanical fasteners include a plurality of clamps, each clamp having two curved ends that are inserted into openings or slots of adjacent frame members. In a further embodiment, each of the plurality of panels includes one or more electrical plug connections.

In yet another aspect, embodiments of the invention provide a modular image capture booth that includes a plurality of interlocking panels. The plurality of interlocking panels forms the walls and ceiling of the modular image capture booth. Each panel includes a plurality of openings, with each opening adapted to receive a digital camera. Each digital camera being at least partially disposed within its respective panel. Each panel includes a router configured to receive and transmit signals from each digital camera in the panel. Each panel further includes one or more lighting fixtures, and also includes wiring from each opening in the panel to the router. The wiring is arranged to connect each digital camera to the router.

In certain embodiments, each of the plurality of interlocking panels is made from molded plastic. In a further embodiment, each of the plurality of interlocking panels comprises an inner surface part and an outer surface part, wherein the two surface parts are each attached at a perimeter thereof. The outer surface part may include one or more openings, each having a removable cover. In various embodiments of the invention, the plurality of interlocking panels may be assembled with or without the use of mechanical fasteners. In a particular embodiment, each of the plurality of interlocking panels has from 4 to 9 openings to receive the digital cameras, and wherein the modular image booth has from 68 to 160 openings to receive the digital cameras.

In some embodiments, the plurality of interlocking panels forms a cylindrical modular image capture booth, and includes a circular ceiling panel. In certain embodiments, there are at least two interlocking panels between the circular ceiling panel and a floor beneath the modular image capture booth. An image processing computer may be connected to an output of each router. The image processing computer configured to process the image recorded by each camera to construct a three-dimensional image of an object in the modular image capture booth.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
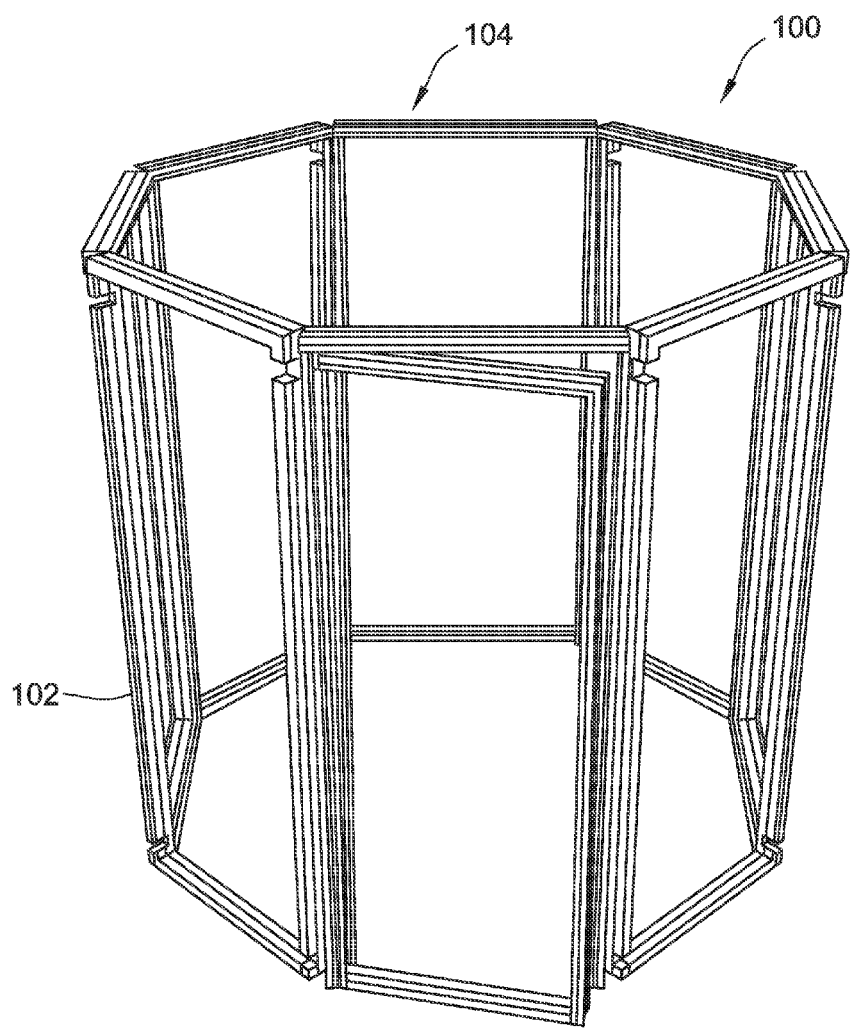
FIG. 1 is a perspective view of an assembled frame for a modular image capture booth, constructed in accordance with an embodiment of the invention.

FIG. 1 is a perspective view of an assembled frame 100 for a modular image capture booth. The assembled frame 100 includes a plurality of frame members 102. The plurality of frame members 102, which include horizontal and vertical frame members 102, which, in particular embodiments, are assembled to construct rectangular panel frames 104. The rectangular panel frames 104 can be attached in a variety of configurations to construct the modular image capture booth. In the embodiment of FIG. 1, the assembled frame 100 is constructed as an octagonal booth, but could be made in a variety of shapes, for example rectangular, pentagonal, hexagonal, etc.

Figure 2:
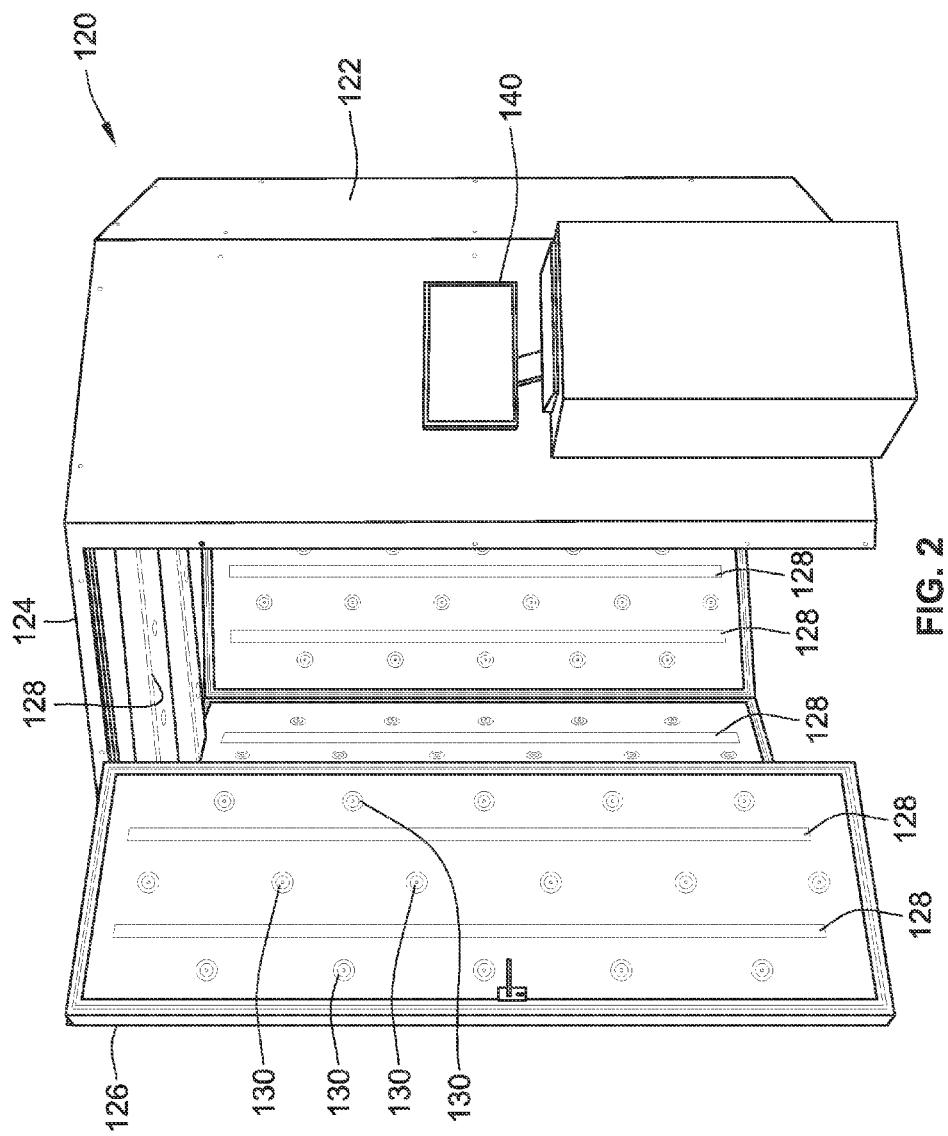
FIG. 2 is a perspective view of a modular image capture booth, according to an embodiment of the invention.

FIG. 2 is a perspective view of the modular image capture booth 120. The modular image capture booth 120 has a plurality of panel sheets (to be described in greater detail below) attached to the interior and exterior of each rectangular panel frames 104 (shown in FIG. 1) to form rectangular panels 122. In the embodiment of FIG. 1, the modular image capture booth 120 is octagonal with eight rectangular panels 122 forming the side walls and one octagonal ceiling panel 124 completing the enclosure formed by the modular image capture booth 120. As implied by the possible shapes for the assembled frame 100 (shown in FIG. 1), the modular image capture booth 120 can be made in a variety of shapes other than octagonal, such as rectangular, pentagonal, hexagonal. As will be shown below, it is also possible to construct a cylindrical modular image capture booth where the image capture booth has a circular footprint and ceiling panel.

As can be seen from the embodiment of FIG. 2, one of the eight rectangular panels 122 includes a doorway with door 126. As also shown in FIG. 2, each rectangular panel 122, along with the door 126 and ceiling panel 124, includes a plurality of LED light strips 128. In the embodiment shown, the LED light strips 128 run vertically along the length of the rectangular panel 122. In an alternate embodiment, a plurality of LED light strips 128 could run horizontally along the width of the rectangular panel 122. In certain embodiments, the LED light strips run at least 75% of the length, or width, of the rectangular panel. Thus, any person or object inside of the modular image capture booth 120 is illuminated by light on all sides. FIG. 2 also shows that each rectangular panel 122, along with the door 126 and ceiling panel 124, includes a plurality of camera lens portals 130 through which a plurality of cameras can photograph the person or object inside of the modular image capture booth 120.

An image processing computer 140 is located on an exterior surface of one of the rectangular panels 122. The image processing computer 140 is coupled to each of the digital camera disposed throughout the mobile image capture booth 120. The image processing computer 140 is configured to control operation of each of the digital cameras, and to collect the images captured by each camera. These multiple collected images are processed by the image processing computer 140 in order to render a three-dimensional image of the person or object in the mobile image capture booth 120.

Figure 3:
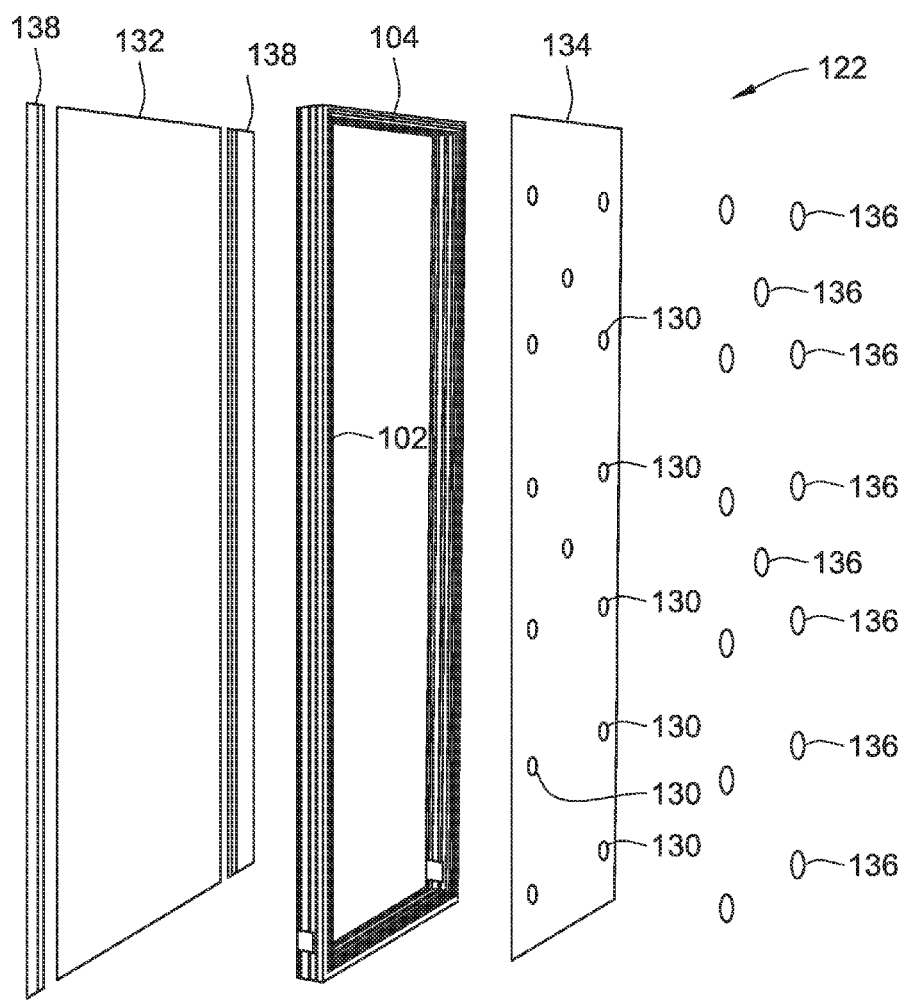
FIG. 3 shows an exploded view of the rectangular panel, according to an embodiment of the invention.

FIG. 3 shows an exploded view of the rectangular panel 122, which includes rectangular frame member 104, exterior panel sheet 132 and interior panel sheet 134. The interior panel sheet has the plurality of the camera lens portals 130 referred to above. As shown in the embodiment of FIG. 3, each of the camera lens portals 130 has a lens cover 136. On each side of the rectangular frame member 104, there is an edge insert 138 that runs the entire length of the vertical frame member 102. The edge insert 138 fits between the vertical frame members 102 of adjacent rectangular frame members 104, and restricts access to pinch points between the vertical frame members 102.

Figure 4:
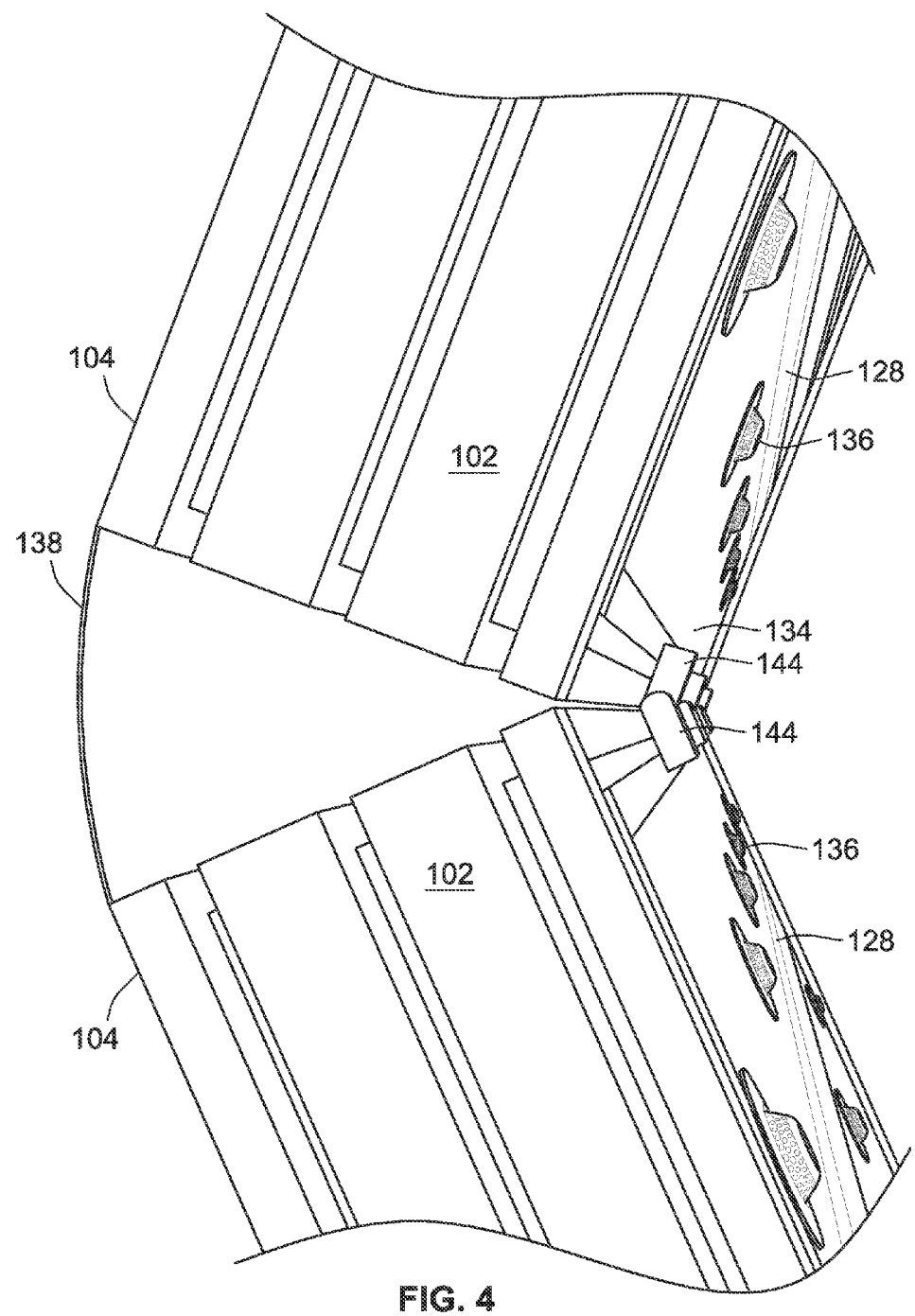
FIG. 4 is a top view of a portion of adjacent rectangular frame members, in accordance with an embodiment of the invention.
Figure 5:
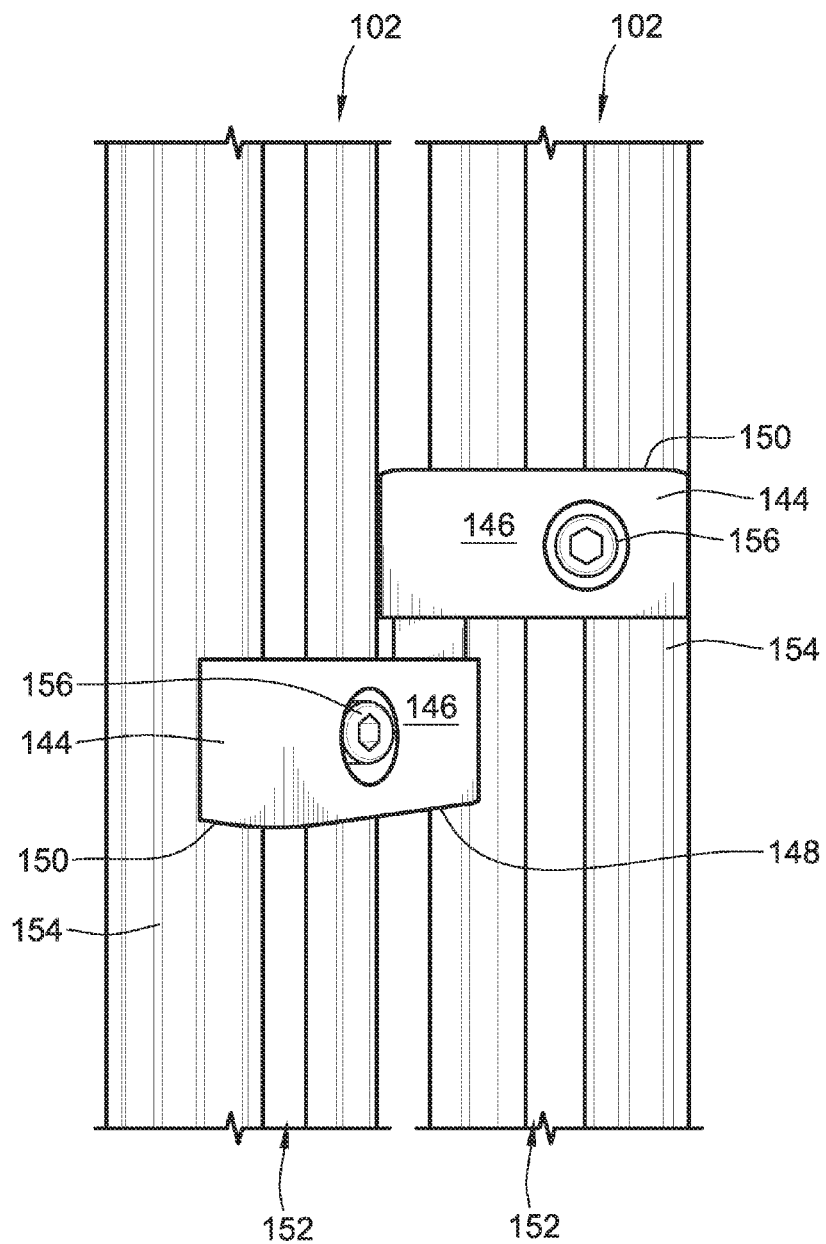
FIG. 5 is a close up view of the mechanical fasteners used to hold adjacent rectangular frame members together, in accordance with an embodiment of the invention.

FIGS. 4 and 5 show close up view of the assembly of adjacent rectangular frame members 104. FIG. 4 shows a top view of a portion of adjacent rectangular frame members 104. The edge insert 138 is disposed between the vertical frame members 102, which abut at an angle. The interior panel sheet 134 includes a plurality of lens covers 136. The adjacent vertical frame members 102 are attached on the interior of the rectangular frame members 104 by a plurality of mechanical fasteners 144. FIG. 5 shows a close up view of the mechanical fasteners 144.

In the embodiment shown, the mechanical fasteners 144 have two arms 146 where one end 148 of each arm is attached to a pin (not shown) where the arms 146 can pivot freely around the pin. The ends 148 of the two arms 146 attached to the pin are disposed between the adjacent vertical frame members 102, while the opposite ends 150 of the two arms 146 engages a vertical channel 154 in a surface of the adjacent vertical frame members 102. In particular embodiments, each of the two arms 146 includes an attaching member (not shown), e.g., a threaded member, that is received in a vertical slot 152 in each of the adjacent vertical frame members 102. Typically, both the vertical channel 154 and the vertical slot 152 run about the entire length of the vertical frame member 102. This configuration allows the mechanical fastener 144 to slide up or down the vertical frame member 102 so as to be located at any point along the vertical frame members 102. In certain embodiments, the two ends 148, 150 of each arm 146 are curved. The attaching member may include a bar (not shown) disposed within the vertical slot 152. The width of the bar may be narrow enough to be inserted into the vertical slot 152, while also being longer than the vertical slot 152 is wide. In this way, the attaching member may be rotated until the ends of the bar contact opposite sides of the vertical slot 152 so as to lock the bar in place in the vertical slot 152. When this is done with both arms 146, the mechanical fastener 144 securely attaches the adjacent vertical frame members 102. In some embodiments, the attaching member is accessed through an opening 156 in the arm 146.

Figure 6:
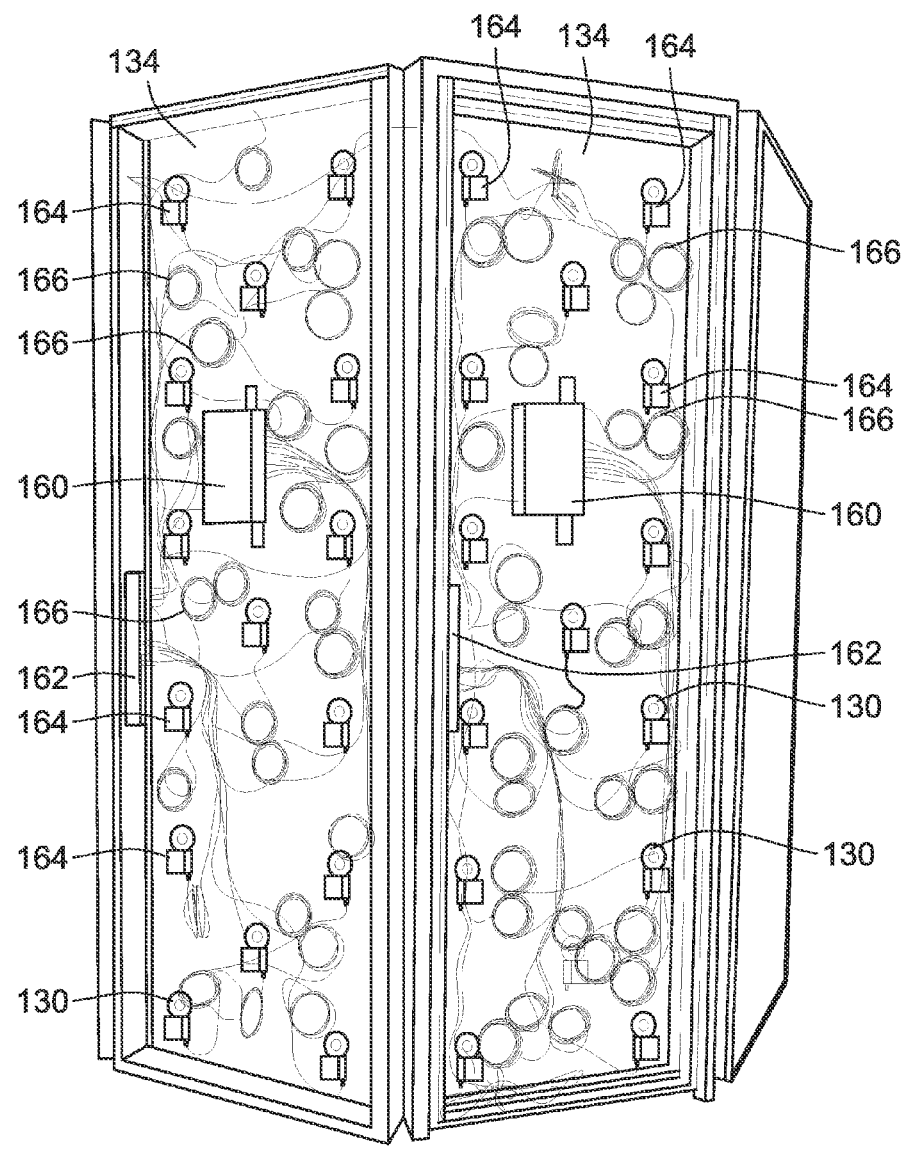
FIG. 6 is a perspective view of the rectangular panel with the exterior panel sheet removed so that the internal components of the rectangular panel are visible, in accordance with an embodiment of the invention.

FIG. 6 shows a perspective view of the rectangular panel 122 with the exterior panel sheet 132 removed so that the internal components of the rectangular panel 122 are visible. As shown in FIG. 6, each rectangular panel 122 includes a router 160 and a power strip 162 having a plurality of electrical outlets. As can also be seen from FIG. 6, each rectangular panel 122 includes a plurality of digital cameras 164 along with control circuitry positioned at each camera lens portal 130 in the interior panel sheet 134. At least a portion of the lens for each digital camera 164 is disposed in its respective camera lens portal 130. At least a portion of each digital camera 164 is disposed within the rectangular panel 122. In a typical embodiment, none of the plurality of digital cameras 164 is visible when the mobile image capture booth 120 is fully assembled. In the embodiment shown, each digital camera 164 is coupled via its control circuitry and wiring 166 to its respective router 160. The routers 160 from each rectangular panel 122, and from the ceiling panel 124, are connected to the image processing computer 140 (shown in FIG. 2). The router 160 is configured to transmit the image from each connected digital camera 164 to the image processing computer 140 where the separate images captured by the digital cameras 164 are combined and integrated in the creation of a three-dimensional image. The connection between the routers 160 and the image processing computer 140 could be wired or wireless. The image processing computer 140 may also be configured to transmit the three-dimensional image to a 3-D printer (not shown), either locally or remotely, designed to produce a three-dimensional rendering of the three-dimensional image.

Figure 7:
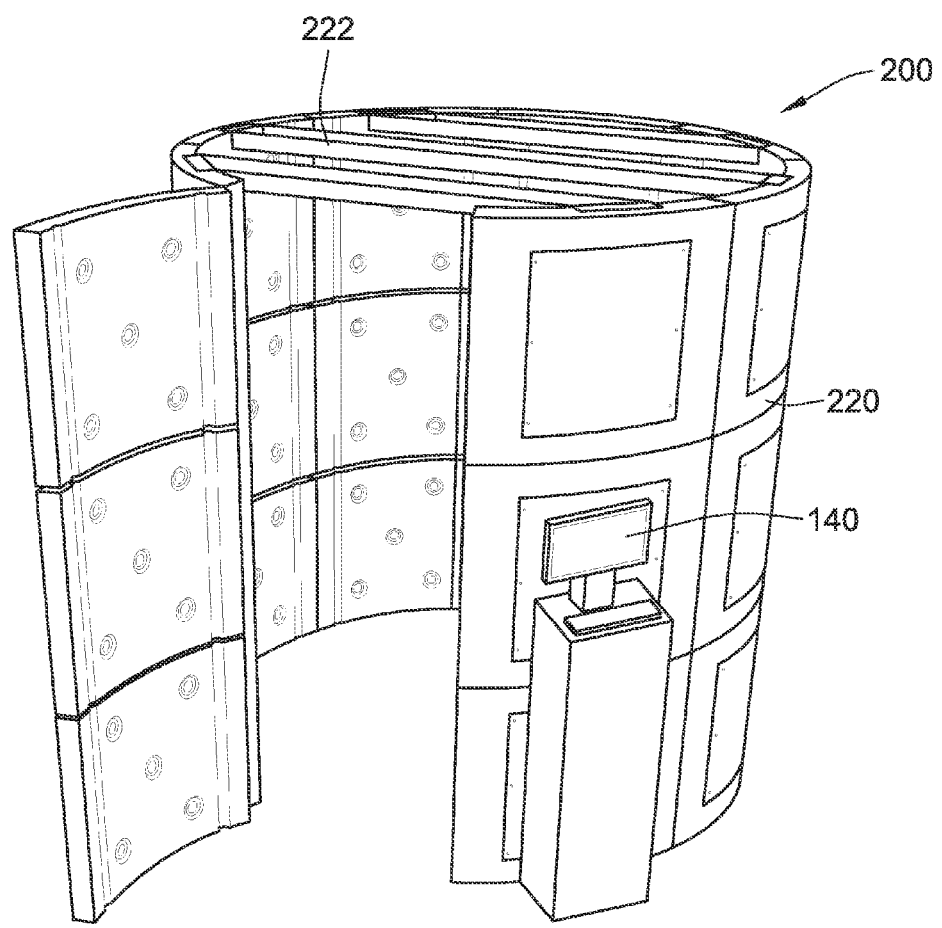
FIG. 7 is a perspective view of an alternate embodiment of a mobile image capture booth having interlocking panels, according to an embodiment of the invention.

FIG. 7 shows a perspective view of an alternate embodiment of a mobile image capture booth 200 comprised of a series of interlocking panels 220. In the embodiment of FIG. 7, the mobile image capture booth 200 is constructed such that each of the interlocking panels 220 is curved such that the footprint of the mobile image capture booth 200 is circular and the mobile image capture booth 200 is cylindrical. In the embodiment shown, the interlocking panels 220 are self-supporting and stackable such that a separate frame is not needed. It is envisioned that the interlocking panels 202 (and 220 described below) may be made from molded plastic or a similarly suitable material. In the embodiment of FIG. 7, the interlocking panels 220 are sized such that the self-supporting interlocking panels 220 are stacked three-high to realize the desired height of the mobile image capture booth 200. In a particular embodiment, the entire mobile image capture booth 200 may be constructed using 24 of the interlocking panels 220, though, depending on the size of the interlocking panels 220, a fewer or greater number could be used to construct the mobile image capture booth 200. The interlocking panels 220 may be configured to be assembled together with or without the use of mechanical fasteners. In the embodiment shown, there are three beams 222 spanning the top of the mobile image capture booth 200, though alternate embodiments may have a fewer or greater number of beams 222. Each end of the beams 222 is attached to the top of one of the interlocking panels 220. One or more of the beams 222 may include additional LED lighting, though this not required.

Figure 8:
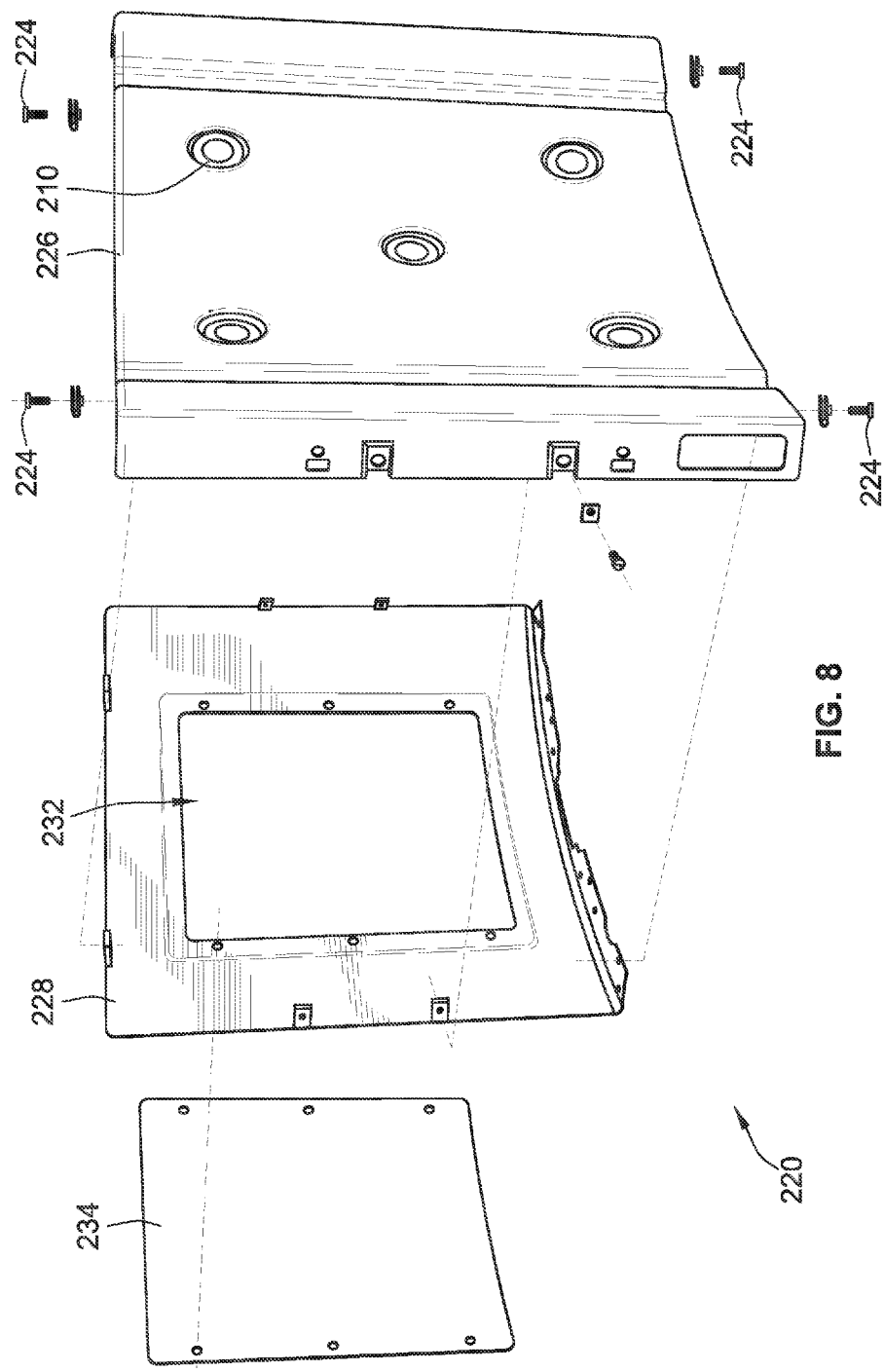
FIG. 8 is an exploded view of the interior side of the interlocking panel, according to an embodiment of the invention.
Figure 9:
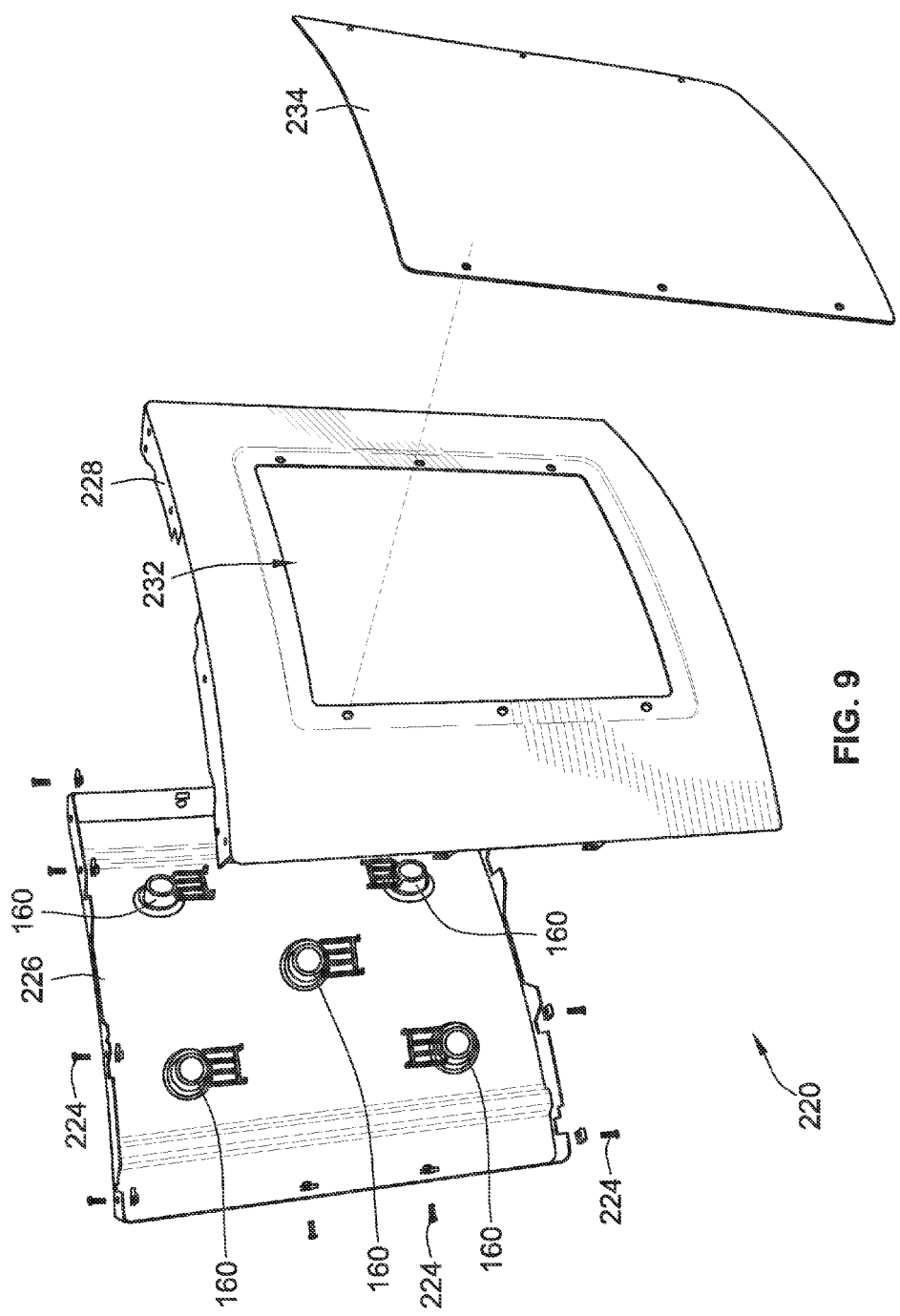
FIG. 9 is an exploded view of the exterior side of the interlocking panel shown in FIG. 8.

FIGS. 8 and 9 show an exemplary embodiment of the interlocking panel 220. FIG. 8 shows an exploded view of the interlocking panel 220 from an interior perspective, while FIG. 9 shows an exploded view of an exterior portion of the interlocking panel 220. As shown, each interlocking panel 220 has an interior panel wall 226 and an exterior panel wall 228, which may be attached either with or without separate mechanical fasteners 224, such as those shown in FIG. 8. Each interior panel wall 226 includes a plurality of camera lens portals 210 through which a plurality of digital cameras 164 can photograph the person or object inside of the modular image capture booth 200 of FIG. 7. It is envisioned that each interlocking panel 220 will include a router 160, a power strip 162 with electrical outlets, a plurality of digital cameras 164 (one for each of the plurality of camera lens portals 210), and wiring 166 similar to that shown in the embodiment of FIG. 6. Similarly, the interaction between the routers 160, digital cameras 164, control circuitry and the image processing computer 140 for the mobile image capture booth 200 would be the same as described above in the mobile image capture booth 120 of FIG. 2.

As shown in the embodiment of FIG. 9, the exterior panel wall 228 includes a large opening 232 with a removable cover 234, which provide access to the inner components (i.e., router 160, power strip 162, digital cameras 164, etc.) without disassembling the interlocking panels 220. The removable cover 234 may be configured to attach to the opening 232 with or without mechanical fasteners.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A modular image capture booth comprising:
a plurality of frame members comprising horizontal and vertical members configured for assembly into a plurality of panel frame members that form a frame for the modular image capture booth;
a plurality of panel sheets each configured for attachment to each of the plurality of panel frame members to form a plurality of panels, the plurality of panels forming walls and a ceiling for the modular image capture booth, wherein certain panel sheets include a plurality of openings, each opening adapted to receive at least a portion of the lens for a digital camera, each digital camera being at least partly disposed within its respective panel;

wherein each panel includes a router configured to receive and transmit signals from each digital camera in the panel, each panel further including one or more lighting fixtures, and further including wiring from each opening in the panel sheet to the router, the wiring arranged to connect each digital camera to the router.

2. The modular image capture booth of claim 1, further comprising an image processing computer connected to an output of each router, the image processing computer configured to process the image recorded by each camera to construct a three-dimensional image of an object in the modular image capture booth.

3. The modular image capture booth of claim 1, wherein one of the plurality of panels includes a doorway.

4. The modular image capture booth of claim 1, wherein a single ceiling panel forms a ceiling of the modular image capture booth, and wherein a plurality of wall panels extends from the ceiling panel to a floor under the modular image capture booth.

5. The modular image capture booth of claim 4, wherein the assembled frame and the single ceiling panel are octagonal and each of the wall panels, that make up the assembled frame, is rectangular.

6. The modular image capture booth of claim 1, wherein each panel includes one or more rows of LED lights that extend along an interior surface of its respective panel, and extends at least 75% of a length of the panel.

7. The modular image capture booth of claim 1, wherein each of the plurality of frame members is made from one of extruded aluminum and extruded plastic.

8. The modular image capture booth of claim 1, wherein the plurality of frame members is held together using a plurality of mechanical fasteners.

9. The modular image capture booth of claim 8, wherein the plurality of mechanical fasteners includes a clamp with two curved ends, each curved end inserted into an opening or slot in adjacent frame members.

10. The modular image capture booth of claim 1, wherein each of the plurality of panels includes one or more electrical plug connections.

11. The modular image capture booth of claim 1, wherein each of the plurality of panels has from 8 to 25 openings to receive the digital cameras, and wherein the modular image booth has from 68 to 160 openings to receive the digital cameras.

12. A modular image capture booth comprising:
a plurality of interlocking panels, the plurality of interlocking panels forming the walls and ceiling of the modular image capture booth, wherein each panel includes a plurality of openings, each opening adapted to receive a digital camera, each digital camera being at least partially disposed within its respective panel;

wherein each panel includes a router configured to receive and transmit signals from each digital camera in the panel, each panel further including one or more lighting fixtures, and further including wiring from each opening in the panel to the router, the wiring arranged to connect each digital camera to the router.

13. The modular image capture booth of claim 12, wherein each of the plurality of interlocking panels is made from molded plastic.

14. The modular image capture booth of claim 13, wherein each of the plurality of interlocking panels comprises an inner surface part and an outer surface part, wherein the two surface parts are each attached at a perimeter thereof.

15. The modular image capture booth of claim 14, wherein the outer surface part has one or more openings, each of the one or more openings having a removable cover.

16. The modular image capture booth of claim 13, wherein the plurality of interlocking panels is assembled without the use of mechanical fasteners.

17. The modular image capture booth of claim 13, wherein the plurality of interlocking panels form a cylindrical modular image capture booth, and includes a circular ceiling panel.

18. The modular image capture booth of claim 17, wherein there are at least two interlocking panels between the circular ceiling panel and a floor beneath the modular image capture booth.

19. The modular image capture booth of claim 12, further comprising an image processing computer connected to an output of each router, the image processing computer configured to process an image recorded by each digital camera to construct a three-dimensional image of an object in the modular image capture booth.

20. The modular image capture booth of claim 12, wherein adjacent interlocking panels are attached using mechanical fasteners.

21. The modular image capture booth of claim 12, wherein each of the plurality of interlocking panels has from 4 to 9 openings to receive the digital cameras, and wherein the modular image capture booth has from 68 to 160 openings to receive the digital cameras.

22. The modular image capture booth of claim 12, wherein each of the plurality of interlocking panels is self-supporting and stackable.

\* \* \* \* \*